United States Patent [19]

Pistiner et al.

[11] 4,010,921
[45] Mar. 8, 1977

[54] SPACECRAFT CLOSED LOOP THREE-AXIS MOMENTUM UNLOADING SYSTEM

[75] Inventors: Josef Siegfried Pistiner, Lafayette Hill, Pa.; Ludwig Muhlfelder, Livingston, N.J.

[73] Assignee: The United States of America as represented by the Secretary of the Air Force, Washington, D.C.

[22] Filed: Aug. 20, 1975

[21] Appl. No.: 606,273

[52] U.S. Cl. .............................. 244/166; 244/165
[51] Int. Cl.$^2$ ............................. B64G 1/10
[58] Field of Search .......... 244/166, 165, 3.2, 3.22; 235/150.2, 150.25

[56] References Cited
UNITED STATES PATENTS

| 3,189,298 | 6/1965 | Buckingham et al. | 244/166 |
| 3,813,067 | 5/1974 | Mork | 244/165 |
| 3,834,653 | 9/1974 | Perkel | 244/166 |

OTHER PUBLICATIONS

"Skewed Versus Orthogonal Reaction Wheels for Outer Planet Exploration," Cummings et al., AAS Conference on the Outer Solar System, June 28–30, 1971, AAS 71-157, pp. 469-493.

*Primary Examiner*—Trygve M. Blix
*Assistant Examiner*—Barry L. Kelmachter
*Attorney, Agent, or Firm*—Joseph E. Rusz; Henry S. Miller

[57] ABSTRACT

A system for autonomously unloading accumulated angular momentum on space craft reaction wheels in the attitude control systems with external torques generated by the interaction of spacecraft magnetic dipoles with the earth's magnetic field.

An onboard computer receives reaction wheel speed information, wheel speed threshold and geomagnetic latitude information and controls magnetic dipoles that will create a spacecraft torque and desaturate reaction wheels in a closed loop system.

5 Claims, 1 Drawing Figure

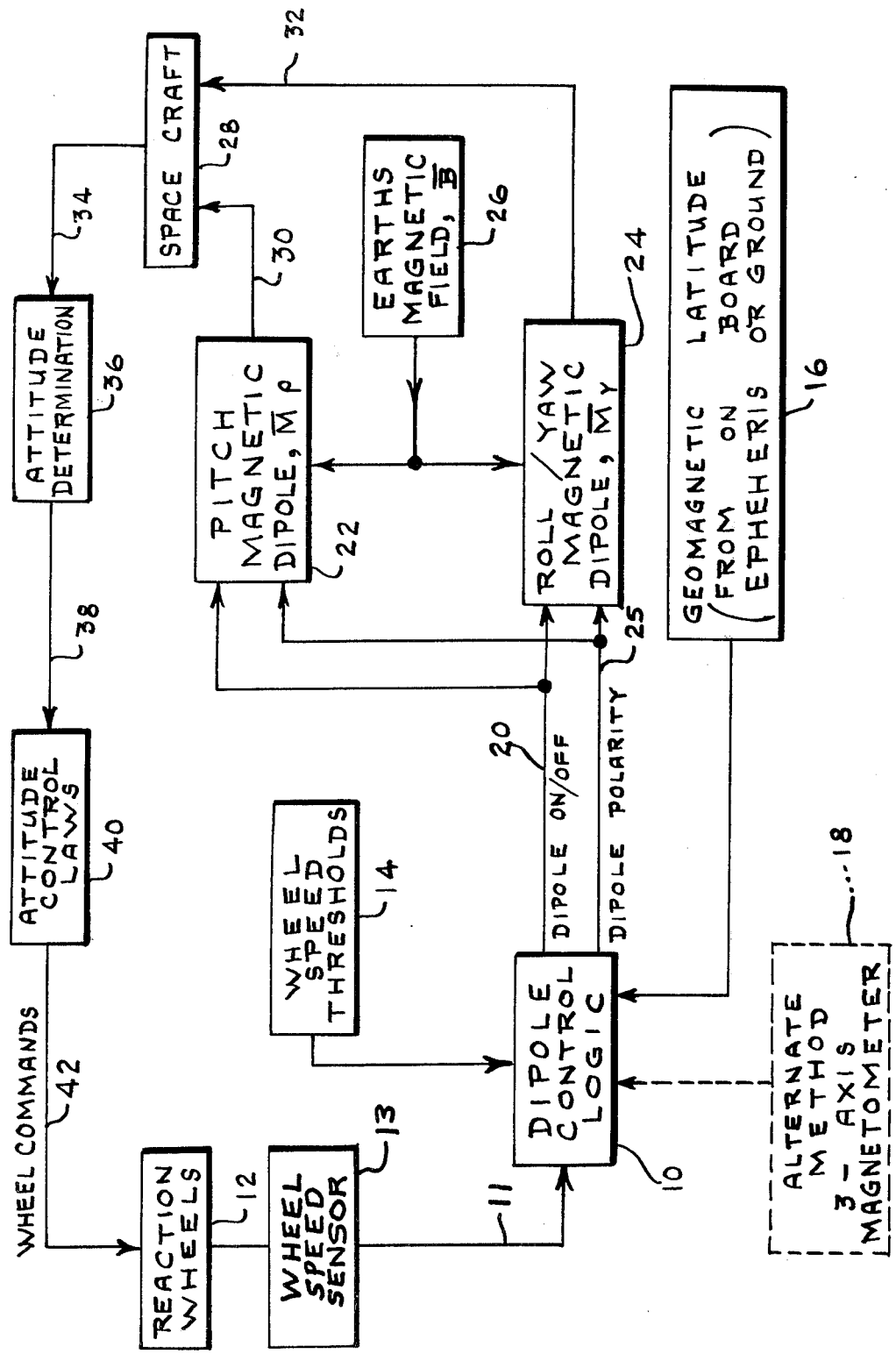

SPACECRAFT CLOSED LOOP THREE-AXIS MOMENTUM UNLOADING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to spacecraft attitude control systems and more particularly to a system using reaction wheels and means for removing accumulated angular momentum from these wheels.

In some spacecraft systems, three-axis attitude control is achieved by means of control torques developed by three reaction wheels in response to sensor-derived information. The three reaction wheels are usually mounted in the spacecraft in such a manner that their axes are parallel to an orthogonal set of body axes about which attitude control is to be maintained.

For example, in an earth-pointing spacecraft, one of the wheel axes is parallel to the spacecraft pitch axis, which nominally has an angular velocity corresponding to the orbital rate, i.e., one revolution per orbit. The remaining two wheel axes are aligned with the spacecraft yaw and roll axes, respectively. As a result of control loop action, in the attitude control system, to overcome the effect of external disturbance torques acting on the spacecraft, angular momentum is accumulated by the reaction wheels. Due to the reaction wheel momentum storage limitations (i.e. speed), means must be provided to periodically remove such accumulated angular momentum by the application of appropriate external control torques to the spacecraft.

SUMMARY OF THE INVENTION

The invention effects removal of the accumulated momentum by application of external torques generated by the interaction of spacecraft magnetic dipoles with the earth's magnetic field. In utilizing a closed loop system it is possible to autonomously unload angular momenta in an orthogonal set of spacecraft reaction wheels.

Momentum unloading for any given spacecraft axis is initiated when the spacecraft is in an appropriate region of the earth's magnetic field and the stored wheel momentum (for the given axis) is equal to or exceeds a specified upper unloading threshold; stored wheel momentum is measured by wheel angular speed since the magnitude of angular momentum is a constant (wheel moment of inertia) multiplied by wheel speed. Unloading continues until the momentum is reduced to a specified lower unloading threshold or the spacecraft leaves the region of the magnetic field specified for unloading.

The existence of the appropriate unloading region is established in a spacecraft computer (or on the ground) by calculating the sine of the geo-magnetic latitude ($\lambda m$) from geographic longitude and latitude for a canted dipole model of the earth's magnetic field. Alternately, appropriate magnetic unloading regions can be defined by utilization of an on-board 3-axis magnetometer.

Polarity of the spacecraft dipole depends on the unloading region and on the polarity of the stored wheel momentum, i.e., wheel speed direction, to be unloaded.

To provide for 3-axis angular momentum unloading, the magnetic unloading system must provide for an orthogonal 3-axis set of torques. (Note that the generated torque is a vector equal to the cross-product of the spacecraft dipole and the earth's magnetic field vectors.) This is accomplished by a pitch axis unloading dipole parallel to the spacecraft roll axis and a combined roll/yaw unloading dipole parallel to the spacecraft pitch axis. In addition, roll and pitch axis angular momenta are unloaded when the earth's magnetic field is essentially perpendicular to the geomatnetic equator, i.e., in the vicinity of the magnetic poles ($\lambda_m = \pm 90°$) or when $\lambda m$ is an extreme; yaw and roll angular momenta are unloaded simultaneously when the earth's magnetic field is essentially parallel to to the geomagnetic equator, i.e., $\lambda m$ is approximately 35° from the geomagnetic descending and ascending nodes. (Note that, depending on spacecraft axis definitions, only two of these four unloading regions will provide for simultaneous roll and yaw momentum unloading for a given dipole polarity).

The widths of the actual unloading regions are selected to assure an unloading capability for all orbital parameter conditions, e.g., orbit inclination, and to account for the canted dipole angle (11.4°) of the earth's magnetic field.

It is therefore an object of the invention to provide a new and improved system for attitude control in spacecraft.

It is another object of the invention to provide a new and improved attitude control system for spacecraft that prevents angular momentum saturation of spacecraft reaction wheels by means of an autonomous closed loop subsystem.

It is another object of the invention to provide a new and improved system for unloading angular moments stored in the reaction wheels of a spacecraft attitude control system.

It is a further object of the invention to provide a new and improved system for autonomously unloading angular moments stored in the reaction wheels of a spacecraft attitude control system.

It is still another object of the invention to provide a new and improved attitude control system for spacecraft that uses torques generated by the interaction of spacecraft magnetic dipoles with the earth's magnetic field.

It is still a further object of the invention to provide a new and improved attitude control system as aforementioned, that functions with three orthogonal axis.

These and other advantages, features and objects of the invention will become more apparent from the following description taken in connection with the illustrative embodiment in the accompanying drawing.

DESCRIPTION OF THE DRAWING

The FIGURE is a functional block diagram of the invention.

DESCRIPTION OF THE PREFERRED EMBODIMENT

Referring now to the figure, the dipole control logic 10 receives speed information from a wheel speed sensor 13 via line 11. Direction input from the reaction wheels 12 is inherent as the direction of each reaction wheel is known. Reaction wheel direction may be orthogonal or skewed to the orthogonal dependent upon the system utilization. The wheel speed threshold 14 is fed into or stored in the logic 10 to enable the system to determine whether the wheel momentum is sufficient for the system to operate. The appropriate unloading region is established in the spacecraft computer by calculating the sine of the geomagnetic latitude or from on-board E pheheris or a ground computer represented by 16. In an alternative form magnetic unloading regions can be defined by utilization of an on-board 3 axis magnetometer 18.

The dipole ON/OFF signal is sent via line 20 to the pitch magnetic dipole 22 and combined roll/yaw magnetic dipole 24. Dipole polarity is dependent upon the unloading region and on the polarity of the stored wheel momentum. It reaches the dipoles 22 and 24 via line 25.

The pitch axis unloading dipole 22 is parallel to the spacecraft roll axis and the combined roll/yaw unloading dipole 24 is parallel to the spacecraft pitch axis. In addition to the ON/OFF and polarity inputs to each dipole the earth's magnetic field ($\bar{B}$) 26 is combined to provide an unloading torque ($\bar{T}$) = $\bar{M} \times \bar{B}$.

Pitch unloading torque reacts on the space craft 28 as represented by line 30, while roll/yaw unloading torque reacts on the spacecraft as represented by line 32. The dipoles are affixed to the spacecraft and their energization causes a spacecraft attitude change in the appropriate direction to desaturate or slow down the reaction wheels. In the spacecraft attitude control system, spacecraft motion is sensed and sent via line 34 to the attitude determination center 36 where the signals are sent via line 38 to the attitude control 40 which sends wheel commands 42 to the reaction wheels 12. The cycle then repeats and the angular momentum of the spacecraft reaction wheels remain below their saturation point.

Although the invention has been described with reference to a particular embodiment, it will be understood to those skilled in the art that the invention is capable of a variety of alternative embodiments within the spirit and scope of the appended claims.

What is claimed is:

1. A closed loop three-axis automatic momentum unloading system for a spacecraft attitude control system comprising:
  a spacecraft vehicle havng an attitude control system including, a plurality of reaction wheels and magnetic dipoles; logic processing means; wheel speed sensor means connected to the logic processing means; wheel speed threshold input means connected to the logic processing means; geomagnetic latitude input means connected to the logic processing means; means connecting said magnetic dipoles and the logic processing means whereby excessive momentum in the reaction wheels will cause a signal to be generated in the logic means and sent to the dipoles of such polarity and magnitude as to cause dipole interaction with the earth magnetic field and cause said attitude control system to react in a manner that will unload momentum stored in said system.

2. A closed loop three-axis momentum unloading system in a spacecraft attitude control system according to claim 1 wherein said reaction wheels are orthogonally mounted.

3. A closed loop three-axis momentum unloading system in a spacecraft attitude control system according to claim 1, wherein said reaction wheels are mounted in a skewed relationship.

4. A closed loop three axis momentum unloading system in a spacecraft attitude control system according to claim 1 wherein said reaction wheels and said magnetic dipoles are orthogonally mounted.

5. A closed loop three-axis momentum unloading system in a spacecraft attitude control system according to claim 1 wherein said reaction wheels and said magnetic dipoles are mounted in a skewed relationship.

* * * * *